(12) United States Patent
Wang

(10) Patent No.: US 8,792,220 B2
(45) Date of Patent: Jul. 29, 2014

(54) POWER SOURCE PROTECTION CIRCUIT INCLUDING OVER-VOLTAGE PROTECTOR AND OVER-CURRENT PROTECTOR

(75) Inventor: Yin-Zhan Wang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 251 days.

(21) Appl. No.: 13/303,005

(22) Filed: Nov. 22, 2011

(65) Prior Publication Data

US 2012/0327542 A1    Dec. 27, 2012

(30) Foreign Application Priority Data

Jun. 22, 2011    (CN) .......................... 2011 1 0168995

(51) Int. Cl.
*H02H 3/00*    (2006.01)
(52) U.S. Cl.
USPC ......................................................... 361/79
(58) Field of Classification Search
USPC ......................................................... 361/79
See application file for complete search history.

(56) References Cited

U.S. PATENT DOCUMENTS

| | | | | |
|---|---|---|---|---|
| 4,935,836 A | * | 6/1990 | Labbus et al. | 361/15 |
| 5,087,871 A | * | 2/1992 | Losel | 323/299 |
| 5,440,441 A | * | 8/1995 | Ahuja | 361/62 |
| 5,793,589 A | * | 8/1998 | Friedl | 361/58 |
| 2003/0132732 A1 | * | 7/2003 | Thomas et al. | 320/134 |
| 2003/0151870 A1 | * | 8/2003 | Gronbach et al. | 361/91.1 |
| 2007/0103834 A1 | * | 5/2007 | Huang et al. | 361/104 |
| 2009/0052103 A1 | * | 2/2009 | Beny | 361/91.1 |
| 2011/0127926 A1 | * | 6/2011 | Samejima et al. | 315/291 |
| 2011/0133711 A1 | * | 6/2011 | Murakami et al. | 323/282 |
| 2011/0181349 A1 | * | 7/2011 | Yamazaki et al. | 327/541 |
| 2011/0210711 A1 | * | 9/2011 | Pelz et al. | 323/283 |

* cited by examiner

*Primary Examiner* — Ronald W Leja
(74) *Attorney, Agent, or Firm* — Novak Druce Connolly Bove + Quigg LLP

(57) ABSTRACT

A protection circuit includes a first input, an over-voltage protector, an over-current protector, and a first output connected in series in that order. The first input is configured for receiving a power source. The first output is configured for outputting a voltage of the power source to a load circuit. The over-voltage protector is configured to cut off an electrical connection between the first input and the first output under the condition that a voltage value of the power source is greater than a predetermined voltage value. The over-current protector is configured to cut off an electrical connection between the first input and the first output under the condition that a current value from the first output is greater than a predetermined current value.

15 Claims, 5 Drawing Sheets

POWER SOURCE PROTECTION CIRCUIT INCLUDING OVER-VOLTAGE PROTECTOR AND OVER-CURRENT PROTECTOR

BACKGROUND

1. Technical Field

The present disclosure relates to a power source protection circuit, and more particularly, to a power source protection circuit including an over-voltage protector and an over-current protector.

2. Description of Related Art

Normally, a power source provides operation voltages to a load circuit via a power switch. However, the power switch can not turn off itself even when the load circuit is damaged or shorted.

Therefore, a power source protection circuit is desired to overcome the above-described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various inventive embodiments of the present disclosure in detail, wherein like numerals refer to like units throughout.

Figure 1:
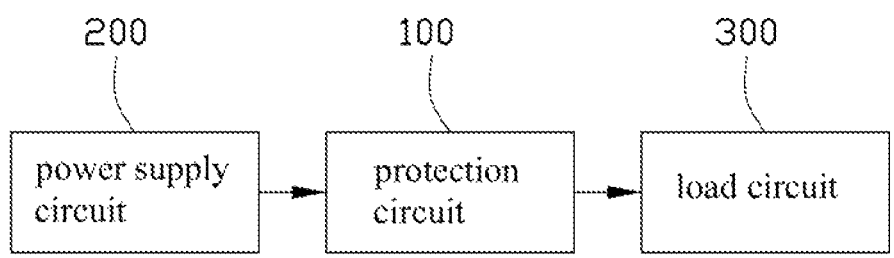
FIG. 1 is a schematic, block diagram of an electrical device in accordance with one embodiment, the electrical device including a protection circuit.

Referring to FIG. 1, an electrical device 10 according to one embodiment of the present disclosure is shown. The electrical device 10 includes a power supply circuit 200, a protection circuit 100, and a load circuit 300 connected in series in that order. The power supply circuit 200 is configured for providing power to the load circuit 300 via the protection circuit 100.

The protection circuit 100 is connected between the power supply circuit 200 and the load circuit 300 to selectively enable or disable the electrical connection between the power supply circuit 200 and the load circuit 300.

In this embodiment, the load circuit 300 can be a signal processor which normally works with a power source such as 5V. In alternative embodiment, the load circuit 300 can be a display driving circuit or a backlight driving circuit which normally works with a power source such as 5V or 12-36V. In one embodiment, the electrical device 10 can be a portable electrical device, such as a mobile phone, a music player, a personal digital assistant, or a personal computer.

Figure 2:
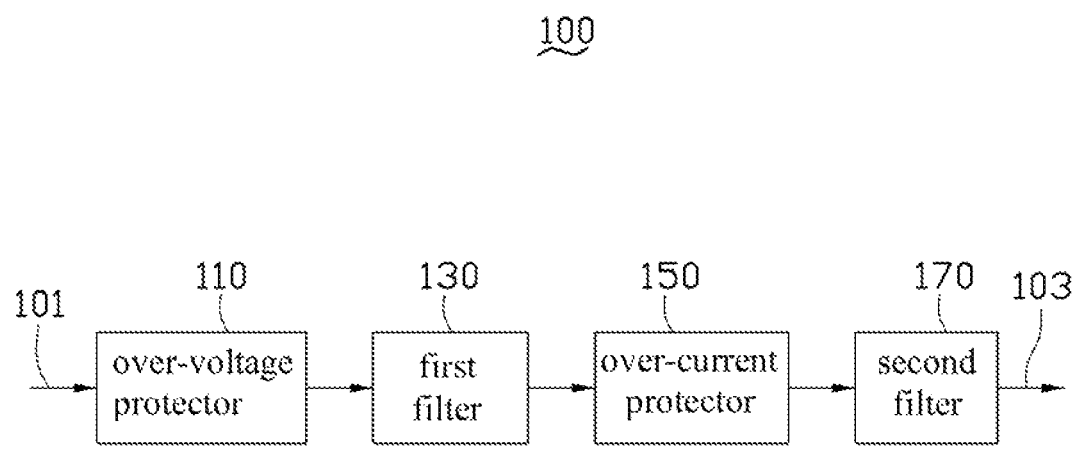
FIG. 2 is a block diagram of one embodiment of the protection circuit of FIG. 1, the protection circuit including an over-voltage protector and an over-current protector.

Referring to FIG. 2, the protection circuit 100 as shown in FIG. 1 includes a first input 101, an over-voltage protector 110, a first filter 130, an over-current protector 150, a second filter 170, and a first output 103 connected in series in that order.

The first input 101 receives a voltage of a power source from the power supply circuit 200 and the voltage is provided to the first filter 130 via the over-voltage protector 110. The first filter 130 is configured for filtering the voltage and providing the filtered voltage to the second filter 170 via the over-current protector 150. The second filter 170 is configured for filtering the voltage again and providing the double filtered voltage to the first output 103. The power source is provided to the load circuit 300 via the first output 103.

The over-voltage protector 110 selectively enables or disables the electrical connection between the first input 101 and the first output 103 according to if an actual voltage of the power source is greater than a predetermined voltage. In this embodiment, when the load circuit 300 normally works with a 5V power source, the predetermined voltage can be set to 5V. In detail, when the actual voltage provided to the first input 101 from the 5V power source is greater than the 5V predetermined voltage (e.g., 6V, as a result of an over-voltage condition), the over-voltage protector 110 disables the electrical connection between the first input 101 and the first output 103 for preventing the 6V power source from being output from the first output 103, otherwise, the over-voltage protector 110 maintains the electrical connection between the first input 101 and the first output 103.

The over-current protector 150 selectively enables or disables the electrical connection between the first input 101 and the first output 103 according to if an actual current output from the first output 103 is greater than a predetermined current. In this embodiment, when the load circuit 300 normally works with a 5V power source, the predetermined current can be set to 0.7 A. In detail, when the actual current output from the first output 103 increases to 0.8 A and is greater than the 0.7 A predetermined current, the over-current protector 150 disables the electrical connection between the first input 101 and the first output 103 for preventing damage of the over-voltage protector 110 or the load circuit 300, otherwise, the over-current protector 150 maintains the electrical connection between the first input 101 and the first output 103.

Figure 3:
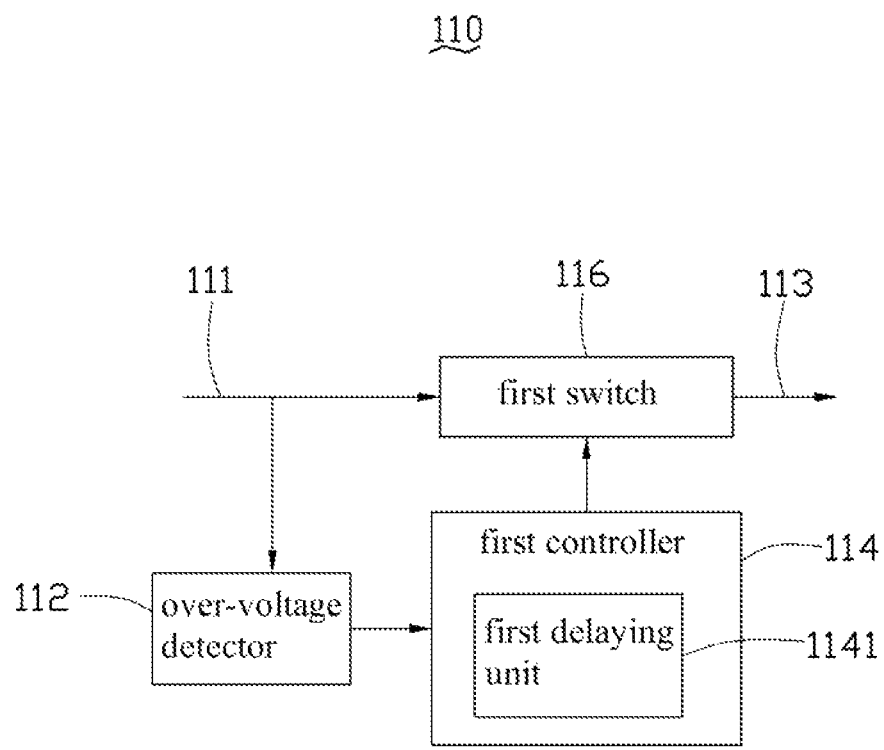
FIG. 3 is a block diagram of one embodiment of the over-voltage protector of FIG. 2.

Referring to FIG. 3, a block diagram of one embodiment of the over-voltage protector 110 of FIG. 2 is shown. The over-voltage protector 110 includes a second input 111, a second output 113, an over-voltage detector 112, a first controller 114, and a first switch 116. The second input 111 connects to the first input 101 for receiving the power source. The second output 113 is configured for outputting the power source from the over-voltage protector 110 to the first filter 130.

The over-voltage detector 112 connects between the second input 111 and the first controller 114 and is configured for detecting if an actual voltage of the power source provided to the second input 111 is greater than the predetermined voltage, thereby providing a voltage detecting signal to the first controller 114. The first controller 114 generates a first controlling signal according to the voltage detecting signal.

In this embodiment, when the actual voltage of the power source is greater than the predetermined voltage, the first controlling signal is a high level voltage (1) and when the actual voltage of the power source is less than or equal to the predetermined voltage, the first controlling signal is a low level voltage (0).

The first switch 116 is controlled by the first controller 114 and connected between the second input 111 and the second output 113. The first switch 116 selectively enables or disables the electrical connection between the second input 111 and the second output 113 according to voltage of the first controlling signal.

In this embodiment, when the first controlling signal provided to the first switch 116 by the first controller 114 is a high level voltage, the first switch 116 is turned off and the electrical connection between the second input 111 and the second output 113 is cut off. When the first controlling signal provided to the first switch 116 by the first controller 114 is a low level voltage, the first switch 116 is turned on and the second input 111 is electrically connected to the second output 113.

The first controller 114 includes a first delaying unit 1141 configured for detecting if the power source of the second input 111 includes some over-voltage pulses.

In this embodiment, when the over-voltage detector 112 detects an over-voltage pulse of the power source and generates a first controlling signal to the first controller 114, the first delaying unit 1141 first receives the voltage detecting signal and buffers the voltage detecting signal for a moment to prevent the first controller 114 generating the first controlling signal to turn off the first switch 116.

Thus, the first switch 116 maintains an activated state and connects the second input 111 and the second output 113 to let the load circuit 300 normally work even when the voltage detecting signal is generated according to the over-voltage pulse of the power source.

Figure 4:
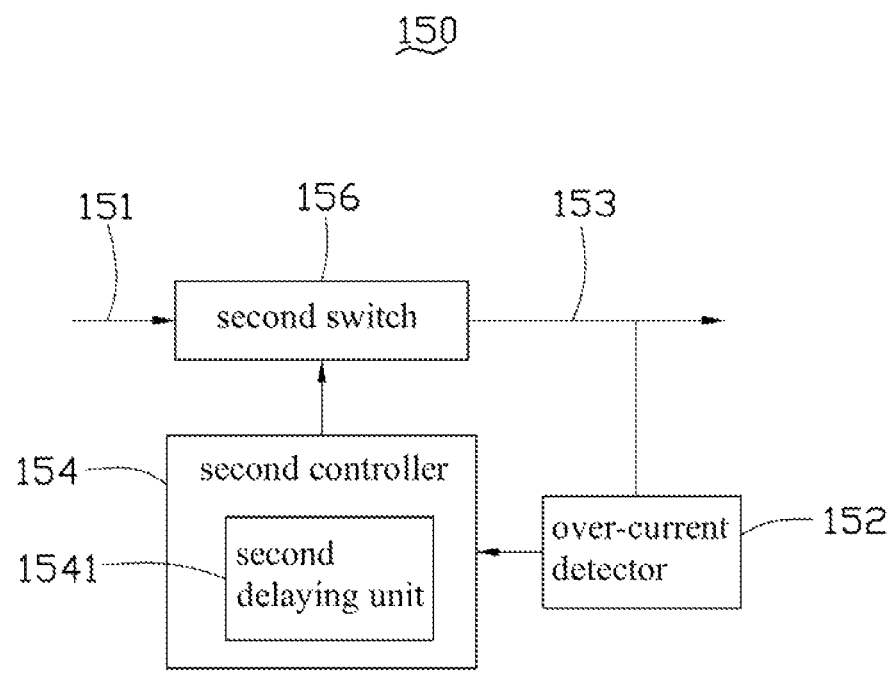
FIG. 4 is a block diagram of one embodiment of the over-current protector of FIG. 2.

Referring to FIG. 4, a block diagram of one embodiment of the over-current protector 150 of FIG. 2 is shown. The over-current protector 150 includes a third input 151, a third output 153, an over-current detector 152, a second controller 154, and a second switch 156. The third input 151 connects the second output 113 of the over-voltage protector 110 via the first filter 130. The third output 153 connects the first output 103 via the second filter 170.

The over-current detector 152 connects between the third output 153 and the second controller 154 to detect if a current output from the third output 153 is greater than a predetermined current, and generate a current detecting signal to the second controller 154 according to a detecting result. The second controller 154 generates a second controlling signal according to the current detecting signal.

In this embodiment, when the actual current output from the third output 153 is greater than the predetermined current, the second controlling signal is a high level voltage and when the actual current output from the third output 153 is less than or equal to the predetermined voltage, the second controlling signal is a low level voltage.

The second switch 156 is controlled by the second controller 154 and connected between the third input 151 and the third output 153. The second switch 156 selectively enables or disables the electrical connection between the third input 151 and the third output 153 according to the voltage of the second controlling signal.

In this embodiment, when the second controlling signal provided to the second switch 156 by the second controller 154 is the high level voltage, the second switch 156 is turned off and the electrical connection between the third input 151 and the third output 153 is cut off. When the second controlling signal is the low level voltage, the second switch 156 is turned on and the third input 151 is electrically connected to the second output 113.

The second controller 154 includes a second delaying unit 1541 configured for detecting if the output current of the third output 153 includes some over-current pulses.

In this embodiment, when the over-current detector 152 detects an over-current pulse from the third output 153 and generates a second controlling signal to the second controller 154, the second delaying unit 1541 first receives the current detecting signal and buffers the current detecting signal for a moment to prevent the second controller 154 generating the second controlling signal to turn off the second switch 156. Thus, the second switch 156 maintains an activated state and connects the third input 151 and the third input 153 to let the load circuit 300 normally work even when the current detecting signal is generated according to the over-current pulse.

Figure 5:
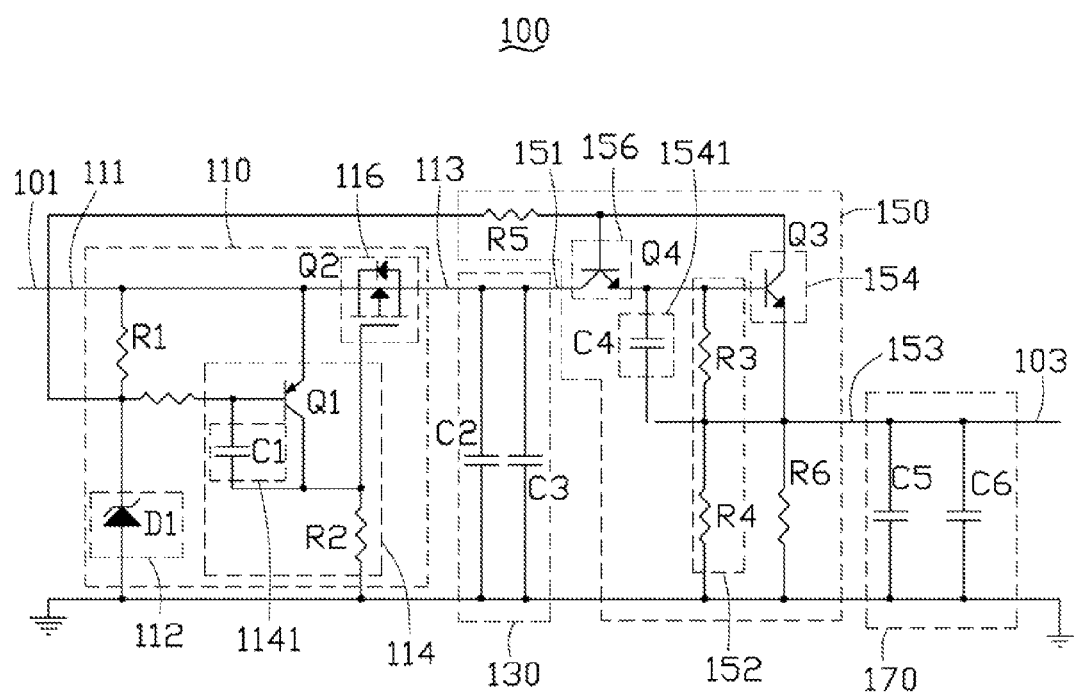
FIG. 5 is a circuit diagram of one embodiment of the over-voltage protector and the over-current protector of FIG. 2.

Referring to FIG. 5, a circuit diagram of one embodiment of the protection circuit 100 of FIG. 1 is shown. In the over-voltage protector 110, the over-voltage detector 112 includes a regulation diode D1, such as a zener diode. The anode of the regulation diode D1 is grounded and the cathode of the regulation diode D1 connects to the first input 101 via a first resistor R1 for limiting a current flowing through the regulation diode D1.

The first controller 114 includes a first transistor Q1 and a second resistor R2. The first transistor Q1 includes a controlling terminal connected to the cathode of the regulation diode D1, a first conductive terminal connected to the second input 111, and a second conductive terminal grounded via the second resistor R2.

The first delaying unit 1141 includes a first buffer capacitor C1 connected between the controlling terminal and the second conductive terminal of the first transistor Q1. In this embodiment, the first transistor Q1 is a bipolar npn transistor, the base of the transistor Q1 is defined as the controlling terminal, the emitter of the first transistor Q1 is defined as the first conductive terminal, and the collector of the first transistor Q1 is defined as the second conductive terminal.

The first switch 116 includes a second transistor Q2. The second transistor Q2 includes a second controlling terminal connected to the second conductive terminal of the first transistor Q1, a third conductive terminal connected to the second input 111, and a fourth conductive terminal defined as the second output 113. In this embodiment, the second transistor Q2 is a p-channel metal oxide semiconductor (PMOS) transistor, the gate of the PMOS transistor Q2 is defined as the second controlling terminal, the source of the PMOS transistor Q2 is defined as the third conductive terminal, and the drain of the PMOS transistor Q2 is defined as the fourth conductive terminal.

The first filter 130 includes two capacitors C2, C3 connected in parallel. One terminal of the two capacitors C2, C3 is connected to the second output 113, and the other terminals of the two capacitors C2, C3 are grounded. In one embodiment, a capacitance of the capacitor C2 can be about 0.1 µF, and a capacitance of the capacitor C3 can be about 470 µF.

The over-current detector 152 includes a third resistor R3 and a fourth resistor R4 connected in series. The fourth resistor R4 has a resistance much greater than that of the third resistor R3. A connecting node between the third resistor R3 and the fourth resistor R4 is defined as the third output 153 and connected to the first output 103.

The second controller 154 includes a third transistor Q3. The third transistor Q3 includes a third controlling terminal connected to ground via the third resistor R3 and the fourth resistor R4 in that order, a fifth conductive terminal connected to the cathode of the regulation diode D1 via a fifth resistor R5, a sixth conductive terminal connected to the third output 153 and connected to ground via a sixth resistor R6.

In this embodiment, the third transistor Q3 is a bipolar npn transistor. The base of the transistor Q3 is defined as the controlling terminal, the emitter of the transistor Q3 is defined as the sixth conductive terminal, and the collector of the transistor Q3 is defined as the fifth conductive terminal.

The second switch 156 includes a fourth transistor Q4. The fourth transistor Q4 includes a fourth controlling terminal connected to the fifth conductive terminal of the third transistor Q3, a seven conductive terminal defined as the third input 151, an eighth conductive terminal connected to the third controlling terminal of the third transistor Q3.

In this embodiment, the fourth transistor Q4 is a bipolar npn transistor. The base of the transistor Q4 is defined as the controlling terminal, the emitter of the transistor Q4 is defined as the eighth conductive terminal, and the collector of the transistor Q4 is defined as the seventh conductive terminal. In alternative embodiment, the third and fourth transistors Q3, Q4 can be NMOS transistors.

The second delaying unit 1541 includes a second buffer capacitor C4 connected in parallel with the third resistor R3.

The second filter 170 includes two capacitors C5, C6 connected in series. One terminals of the capacitors C5, C6 are connected to the third output 153 and the other terminals of the capacitors C5, C6 are grounded. In this embodiment, a capacitance of the capacitor C5 is 470 µF and a capacitance of the capacitor C6 can be about 0.1 µF.

An operation of the protection circuit 100 is described in detail as follows.

When the predetermined voltage, such as a breakdown voltage of the regulation diode D1, is set to 6V, and the power source at the first input 101 is 5V, the regulation diode D1 normally works and provides a steady voltage, such as 5V, to turn off the first transistor Q1 and turn on the fourth transistor Q4. The second transistor Q2 is normally turned on because that the second controlling terminal of the second transistor Q2 is grounded via the second resistor R2. Therefore, the 5V power source is provided to the first output 103 for driving the load circuit 300 via the activated second transistor Q2, the fourth transistor Q4, the third resistor R3 in that order.

When the power source at the first input 101 changes to be greater than the 6V predetermined voltage, the regulation diode D1 works in an inverse breakdown mode to turn on the first transistor Q1. At this moment, the second transistor Q2 is turned off because that the second controlling terminal of the second transistor Q2 is connected to the 6V power source via the activated first transistor Q1. Therefore, the electrical connection between the second input 111 and the second output 113 is cut off, and the 6V power source can not be provided to the first output 103 for protecting the load circuit 300.

On the other hand, in this embodiment, the predetermined current output from the third output 153 set to 0.7 A and a resistance of the third resistor R3 set to 1Ω. When the load circuit 300 normally works and a normal current output from the third output 153 is in range of 0 A-0.7 A, a voltage difference across the third resistor R3 is less than 0.7V to turn off the third transistor Q3.

When the load circuit 300 abnormally works, for example shorted to connect ground. An over-current output from the third output 153 is greater than 0.7 A, such as 1 A, a voltage difference across the third resistor R3 is 1V which is greater than 0.7V to turn on the third transistor Q3. Therefore, the base of the fourth transistor Q4 is also grounded via the activated third transistor Q3, thereby turning off the fourth transistor Q4. Therefore, the electrical connection between the third input 151 and the third output 153 is cut off for protecting the load circuit 300 and the over-voltage protector 110.

It is to be understood, however, that even though numerous characteristics and advantages of certain inventive embodiments have been set out in the foregoing description, together with details of the structures and functions of the embodiments, the disclosure is illustrative only; and that changes may be made in detail, especially in matters of arrangement of parts within the principles of present invention to the full extent indicated by the broad general meaning of the terms in which the appended claims are expressed.

What is claimed is:

1. A protection circuit comprising: a first input, an over-voltage protector, an over-current protector, and a first output connected in series in that order, the first input configured for receiving a power source, the first output configured for outputting a voltage of the power source to a load circuit, the over-voltage protector configured to cut off an electrical connection between the first input and the first output under the condition that a voltage value of the power source is greater than a predetermined voltage value, the over-current protector configured to cut off an electrical connection between the first input and the first output under the condition that a current value from the first output is greater than a predetermined current value; and wherein the over-voltage protector comprises a second input connected with the first input, an over-voltage detector, a first controller, a first switch, and a second output; the over-current protector comprises a third input connected with the second output, an over-current detector, a second controller, a second switch, and a third output; the third input is connected to the second output, and the third output is connected to the first output; the over-current detector is configured for detecting if a current flowing from the third output is greater than the predetermined current value, and the second controller is configured for turning on or turning off the second switch according to a detecting result from the over-current detector.

2. The protection circuit of claim 1, wherein the over-voltage protector is configured to maintain an electrical connection between the first input and the first output under the condition that a voltage value of the power source is less than or equal to the predetermined voltage value.

3. The protection circuit of claim 1, wherein the over-voltage detector is configured to detect if the voltage value of the power source is greater than the predetermined voltage value, and the first controller is configured to turn on or turn off the first switch according to a detecting result from the over-voltage detector.

4. The protection circuit of claim 3, wherein the first controller turns off the first switch under the condition that the voltage value of the power source is greater than the predetermined voltage value, and turns on the first switch under the condition that the voltage value of the power source is less than or equal to the predetermined voltage value.

5. The protection circuit of claim 3, wherein the over-voltage detector comprises a regulation diode, a cathode of the regulation diode is connected to the first input, an anode of the regulation diode is grounded.

6. The protection circuit of claim 3, wherein the first controller comprises a first transistor and a first resistor, the first transistor comprises a control terminal, a first conductive terminal, and a second conductive terminal, the first control terminal is connected to the cathode of the regulation diode, the first conductive terminal is connected to the first input, the second conductive terminal is grounded via the first resistor.

7. The protection circuit of claim 6, wherein the first switch comprises a second transistor, the second transistor comprises a second control terminal connected to the second conductive terminal of the first transistor, a third conductive terminal connected to the second input, and a fourth conductive terminal connected to the second output.

8. The protection circuit of claim 7, wherein the overvoltage protector further comprises a first delaying unit, the first delaying unit comprises a first buffer capacitor, and the first buffer capacitor is connected between the control terminal and the second conductive terminal of the first transistor.

9. The protection circuit of claim 8, wherein the second controller turns off the second switch under the condition that the current flowing from the third output is greater than the predetermined current value, and turns on the second switch under the condition that the current flowing from the third output is less than or equal to the predetermined current value.

10. The protection circuit of claim 8, wherein the overcurrent detector comprises a third resistor and a fourth resistor connected in series to ground.

11. The protection circuit of claim 10, wherein the fourth resistor has a resistance greater than that of the third resistor.

12. The protection circuit of claim 10, wherein a connecting node between the third resistor and the fourth resistor is defined as the third output.

13. The protection circuit of claim 10, wherein the second controller comprises a third transistor, the third transistor comprises a third controlling terminal connected to the ground via the third resistor and the fourth resistor in that order, a fifth conductive terminal connected to the cathode of the regulation diode via a fifth resistor, a sixth conductive terminal connected to the third output.

14. The protection circuit of claim 13, wherein the second switch comprises a fourth transistor, the fourth transistor comprises a fourth controlling terminal connected to the fifth conductive terminal of the third transistor, a seven conductive terminal defined as the third input, an eighth conductive terminal connected to the third controlling terminal of the third transistor.

15. The protection circuit of claim 14, wherein the overcurrent protector further comprises a second delaying unit, the second delaying unit comprises a second buffer capacitor connected in parallel with the third resistor.

\* \* \* \* \*